(12) United States Patent
Nair et al.

(10) Patent No.: US 9,141,658 B1
(45) Date of Patent: Sep. 22, 2015

(54) DATA CLASSIFICATION AND MANAGEMENT FOR RISK MITIGATION

(75) Inventors: Manoj Nair, Cary, NC (US); Stephen R. Perrin, Chapel Hill, NC (US)

(73) Assignee: EMC CORPORATION, Hopkinton, MA (US)

( * ) Notice: Subject to any disclaimer, the term of this patent is extended or adjusted under 35 U.S.C. 154(b) by 1270 days.

(21) Appl. No.: 11/864,760

(22) Filed: Sep. 28, 2007

(51) Int. Cl.
G06F 17/30 (2006.01)

(52) U.S. Cl.
CPC .............................. *G06F 17/30345* (2013.01)

(58) Field of Classification Search
USPC .................. 707/607, 609, 687, 790, 818, 821
See application file for complete search history.

(56) References Cited

U.S. PATENT DOCUMENTS

| | | | |
|---|---|---|---|
| 6,003,040 A | 12/1999 | Mital et al. |
| 6,167,445 A | 12/2000 | Gai et al. |
| 6,308,216 B1 | 10/2001 | Goldszmidt et al. |
| 6,349,297 B1 | 2/2002 | Shaw et al. |
| 6,363,053 B1 | 3/2002 | Schuster et al. |
| 6,430,613 B1 | 8/2002 | Brunet et al. |
| 6,591,300 B1 | 7/2003 | Yurkovic |
| 6,633,312 B1 | 10/2003 | Rochford et al. |
| 6,865,728 B1 | 3/2005 | Branson et al. |
| 7,028,312 B1 | 4/2006 | Merrick et al. |
| 7,185,073 B1 | 2/2007 | Gai et al. |
| 7,240,076 B2 | 7/2007 | McCauley et al. |
| 7,278,156 B2 | 10/2007 | Mei et al. |
| 7,363,292 B2 | 4/2008 | Chaboche |
| 7,412,518 B1 | 8/2008 | Duigou et al. |
| 7,433,304 B1 | 10/2008 | Galloway et al. |
| 7,543,020 B2 | 6/2009 | Walker et al. |
| 7,548,915 B2 | 6/2009 | Ramer et al. |
| 7,565,324 B2 | 7/2009 | Vincent |
| 7,565,656 B2 | 7/2009 | Yamasaki et al. |
| 7,580,357 B2 | 8/2009 | Chang et al. |
| 7,613,806 B2 | 11/2009 | Wright et al. |
| 7,616,642 B2 | 11/2009 | Anke et al. |
| 7,640,345 B2 | 12/2009 | Nair et al. |
| 7,676,798 B2 | 3/2010 | Snover et al. |

(Continued)

FOREIGN PATENT DOCUMENTS

EP 1855218 A2 11/2007
WO WO 2008/036621 3/2008

OTHER PUBLICATIONS

U.S. Appl. No. 11/692,051, filed Mar. 27, 2007, Perrin et al.

(Continued)

*Primary Examiner* — Sana Al Hashemi
(74) *Attorney, Agent, or Firm* — Workman Nydegger

(57) ABSTRACT

An information management system is leveraged to mitigate risks associated with data objects in a computer system. The information management system collects information about the data objects and classifies the data objects into one or more categories. The results of the classification and/or the collected information can be stored in a data repository and used to mitigate legal and/or security risks. For instance, the data repository can be searched and/or queried to identify data objects that a party associated with the computer system is legally required to disclose to an adverse party in a legal proceeding. Alternately or additionally, the information in the data repository can be used to classify a data object into a category requiring one or more security and/or legal measures. The information management system maps the category to a service level and orchestrates execution of the service level.

20 Claims, 3 Drawing Sheets

(56) References Cited

U.S. PATENT DOCUMENTS

| | | |
|---|---|---|
| 7,725,570 B1 | 5/2010 | Lewis |
| 7,725,571 B1 | 5/2010 | Lewis |
| 7,730,172 B1 | 6/2010 | Lewis |
| 7,734,765 B2 | 6/2010 | Musman et al. |
| 7,739,239 B1 | 6/2010 | Cormie et al. |
| 7,895,220 B2 | 2/2011 | Evans et al. |
| 7,953,740 B1 | 5/2011 | Vadon et al. |
| 8,069,435 B1 | 11/2011 | Lai |
| 8,104,080 B2 | 1/2012 | Burns et al. |
| 8,548,964 B1 | 10/2013 | Nair et al. |
| 8,620,724 B2 | 12/2013 | Adhiraju et al. |
| 2002/0016800 A1 | 2/2002 | Spivak et al. |
| 2002/0091746 A1 | 7/2002 | Umberger et al. |
| 2002/0120685 A1 | 8/2002 | Srivastava et al. |
| 2002/0161883 A1 | 10/2002 | Matheny et al. |
| 2003/0023587 A1 | 1/2003 | Dennis et al. |
| 2003/0023712 A1 | 1/2003 | Zhao et al. |
| 2003/0036886 A1 | 2/2003 | Stone |
| 2003/0041050 A1 | 2/2003 | Smith et al. |
| 2003/0093528 A1 | 5/2003 | Rolia |
| 2003/0140009 A1 | 7/2003 | Namba et al. |
| 2003/0167180 A1 | 9/2003 | Chung et al. |
| 2003/0196108 A1* | 10/2003 | Kung .................. 713/200 |
| 2003/0212778 A1 | 11/2003 | Collomb |
| 2003/0225829 A1 | 12/2003 | Pena et al. |
| 2003/0233391 A1 | 12/2003 | Crawford et al. |
| 2003/0233464 A1 | 12/2003 | Walpole et al. |
| 2003/0236904 A1 | 12/2003 | Walpole et al. |
| 2004/0060002 A1 | 3/2004 | Lucovsky et al. |
| 2004/0098415 A1 | 5/2004 | Bone et al. |
| 2004/0133876 A1 | 7/2004 | Sproule |
| 2004/0215650 A1 | 10/2004 | Shaji et al. |
| 2004/0236660 A1 | 11/2004 | Thomas et al. |
| 2004/0243699 A1 | 12/2004 | Koclanes et al. |
| 2005/0060662 A1 | 3/2005 | Soares et al. |
| 2005/0071182 A1 | 3/2005 | Aikens et al. |
| 2005/0102297 A1 | 5/2005 | Lloyd et al. |
| 2005/0125768 A1 | 6/2005 | Wong et al. |
| 2005/0132034 A1 | 6/2005 | Iglesia et al. |
| 2005/0177545 A1 | 8/2005 | Buco et al. |
| 2005/0197852 A1 | 9/2005 | Gebhard et al. |
| 2005/0235342 A1 | 10/2005 | Ene-Pietrosanu et al. |
| 2005/0251533 A1 | 11/2005 | Harken et al. |
| 2005/0262097 A1 | 11/2005 | Sim-Tang et al. |
| 2005/0273451 A1 | 12/2005 | Clark et al. |
| 2005/0289216 A1 | 12/2005 | Myka et al. |
| 2006/0015388 A1 | 1/2006 | Flockhart et al. |
| 2006/0036463 A1 | 2/2006 | Patrick et al. |
| 2006/0039364 A1 | 2/2006 | Wright |
| 2006/0092861 A1 | 5/2006 | Corday et al. |
| 2006/0095543 A1 | 5/2006 | Ito et al. |
| 2006/0095570 A1 | 5/2006 | O'Sullivan |
| 2006/0101084 A1 | 5/2006 | Kishi et al. |
| 2006/0106782 A1 | 5/2006 | Blumenau et al. |
| 2006/0112108 A1 | 5/2006 | Eklund et al. |
| 2006/0114832 A1 | 6/2006 | Hamilton et al. |
| 2006/0129415 A1 | 6/2006 | Thukral et al. |
| 2006/0129974 A1 | 6/2006 | Brendle et al. |
| 2006/0179143 A1 | 8/2006 | Walker et al. |
| 2006/0236061 A1 | 10/2006 | Koclanes |
| 2006/0248165 A1 | 11/2006 | Sridhar et al. |
| 2006/0248187 A1 | 11/2006 | Thorpe et al. |
| 2007/0038683 A1 | 2/2007 | Dixon et al. |
| 2007/0055689 A1 | 3/2007 | Rhoads et al. |
| 2007/0058632 A1 | 3/2007 | Back et al. |
| 2007/0061363 A1 | 3/2007 | Ramer et al. |
| 2007/0070894 A1 | 3/2007 | Wang et al. |
| 2007/0083875 A1 | 4/2007 | Jennings |
| 2007/0094392 A1 | 4/2007 | Stone et al. |
| 2007/0103984 A1 | 5/2007 | Kavuri et al. |
| 2007/0104208 A1 | 5/2007 | Svensson |
| 2007/0127370 A1 | 6/2007 | Chang et al. |
| 2007/0153802 A1 | 7/2007 | Anke et al. |
| 2007/0162749 A1 | 7/2007 | Lim |
| 2007/0192352 A1 | 8/2007 | Levy |
| 2007/0208751 A1 | 9/2007 | Cowan et al. |
| 2007/0214208 A1 | 9/2007 | Balachandran |
| 2007/0226228 A1 | 9/2007 | Her et al. |
| 2007/0260640 A1 | 11/2007 | Hamilton et al. |
| 2007/0294406 A1 | 12/2007 | Suer et al. |
| 2007/0299828 A1 | 12/2007 | Lewis et al. |
| 2008/0002678 A1 | 1/2008 | Klessig et al. |
| 2008/0005086 A1 | 1/2008 | Moore |
| 2008/0021850 A1 | 1/2008 | Irle et al. |
| 2008/0049642 A1 | 2/2008 | Gudipudi et al. |
| 2008/0059387 A1 | 3/2008 | Vaidhyanathan et al. |
| 2008/0071726 A1 | 3/2008 | Nair et al. |
| 2008/0071727 A1 | 3/2008 | Nair et al. |
| 2008/0071813 A1 | 3/2008 | Nair et al. |
| 2008/0077682 A1 | 3/2008 | Nair et al. |
| 2008/0077995 A1 | 3/2008 | Curnyn et al. |
| 2008/0097923 A1 | 4/2008 | Kim et al. |
| 2008/0114725 A1 | 5/2008 | Indeck et al. |
| 2008/0134043 A1 | 6/2008 | Georgis et al. |
| 2008/0177994 A1 | 7/2008 | Mayer |
| 2008/0243900 A1 | 10/2008 | Yohanan et al. |
| 2008/0301760 A1 | 12/2008 | Lim |
| 2009/0064185 A1 | 3/2009 | Araujo |
| 2009/0077210 A1 | 3/2009 | Musman et al. |
| 2009/0150431 A1 | 6/2009 | Schmidt et al. |
| 2009/0157881 A1 | 6/2009 | Kavuri et al. |
| 2010/0250497 A1 | 9/2010 | Redich et al. |
| 2013/0110840 A1 | 5/2013 | Nair et al. |

OTHER PUBLICATIONS

U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed, Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell II.
U.S. Appl. No. 11/772,192, filed Jun. 30, 2007, Nair et al.
U.S. Appl. No. 11/864,596, filed Sep. 28, 2007, Nair et al.
U.S. Appl. No. 11/864,605, filed Sep. 28, 2007, Nair et al.
U.S. Appl. No. 11,864,764, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/528,783, Jan. 15, 2010, Office Action.
U.S. Appl. No. 11/528,772, Sep. 12, 2008, Pre-Interview First Office Action.
U.S. Appl. No. 11/528,772, Dec. 22, 2008, First Action Interview.
U.S. Appl. No. 11/528,772, Jun. 3, 2009, Final Office Action.
U.S. Appl. No. 11/528,772, Jan. 28, 2010, Office Action.
U.S. Appl. No. 11/528,783, Nov. 7, 2008, Pre-Interview First Office Action.
U.S. Appl. No. 11/528,783, Feb. 24, 2009, Office Action.
U.S. Appl. No. 11/528,783, Jun. 25, 2009, Final Office Action.
U.S. Appl. No. 11/692,058, Jan. 8, 2010, Final Office Action.
U.S. Appl. No. 11/528,898, Sep. 5, 2008, Pre-Interview First Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,898, Oct. 7, 2009, Final Office Action.
U.S. Appl. No. 11/528,900, Jun. 9, 2008, Office Action.
U.S. Appl. No. 11/528,900, Jan. 23, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/864,596, Nov. 12, 2009, Office Action.
U.S. Appl. No. 11/694,753, Mar. 25, 2009, Office Action.
U.S. Appl. No. 11/694,753, Nov. 18, 2009, Final Office Action.
U.S. Appl. No. 11/694,783, Feb. 6, 2009, Office Action.
U.S. Appl. No. 11/692,051, Aug. 26, 2009, Office Action.
U.S. Appl. No. 11/692,051, Feb. 19, 2010, Notice of Allowance.
U.S. Appl. No. 11/694,764, Jan. 28, 2010, Office Action.
U.S. Appl. No. 11/772,179, Aug. 19, 2009, Office Action.
U.S. Appl. No. 11/772,179, Feb. 23, 2010, Final Office Action.
U.S. Appl. No. 11/864,770, Nov. 27, 2009, Office Action.
U.S. Appl. No. 11/864,605, Jan. 14, 2010, Office Action.
U.S. Appl. No. 11/692,051, Mar. 31, 2010, Notice of Allowance.
U.S. Appl. No. 11/692,058, Jul. 6, 2010, Office Action.

(56) References Cited

OTHER PUBLICATIONS

U.S. Appl. No. 11/694,753, Mar. 29, 2010, Office Action.
U.S. Appl. No. 11/772,192, Apr. 15, 2010, Office Action.
U.S. Appl. No. 11/864,596, May 26, 2010, Final Office Action.
U.S. Appl. No. 11/864,605, May 28, 2010, Final Office Action.
U.S. Appl. No. 11/864,770, Apr. 21, 2010, Final Office Action.
U.S. Appl. No. 11/772,192, Oct. 29, 2010, Final Office Action.
U.S. Appl. No. 11/864,605, Nov. 4, 2010, Office Action.
U.S. Appl. No. 11/864,770, Nov. 3, 2010, Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/694,753, Oct. 5, 2010, Final Office Action.
U.S. Appl. No. 11/694,764, Aug. 4, 2010, Final Office Action.
U.S. Appl. No. 11/528,772, Mar. 3, 2011, Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,770, Apr. 19, 2011, Final Office Action.
U.S. Appl. No. 11/864,764, Jan. 27, 2011, Office Action.
U.S. Appl. No. 13/972,089, filed Aug. 21, 2013, Nair et al.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
Gasser et al., "An Architecture for Practical Delegation in a Distributed System", 1990 IEEE Computer Society Symposium, May 7-9, 1990, pp. 20-30.
U.S. Appl. No. 11/528,783, Aug. 15, 2012, Final Office Action.
U.S. Appl. No. 11/528,783, Feb. 4, 2015, Office Action.
U.S. Appl. No. 11/528,790, Jul. 18, 2012, Final Office Action.
U.S. Appl. No. 11/528,790, Jun. 17, 2013, Office Action.
U.S. Appl. No. 11/528,790, Jan. 10, 2014, Final Office Action.
U.S. Appl. No. 11/528,790, May 8, 2014, Notice of Allowance.
U.S. Appl. No. 11/528,898, Oct. 2, 2012, Final Office Action.
U.S. Appl. No. 11/528,898, Sep. 24, 2014, Office Action.
U.S. Appl. No. 11/694,753, Aug. 31, 2012, Notice of Allowance.
U.S. Appl. No. 11/694,764, Aug. 1, 2012, Office Action.
U.S. Appl. No. 11/694,764, Nov. 29, 2012, Final Office Action.
U.S. Appl. No. 11/694,764, May 21, 2013, Notice of Allowance.
U.S. Appl. No. 11/772,179, Nov. 13, 2012, Final Office Action.
U.S. Appl. No. 11/772,179, Oct. 11, 2013, Office Action.
U.S. Appl. No. 11/772,179, Jul. 3, 2014, Final Office Action.
U.S. Appl. No. 11/772,192, Jun. 12, 2012, Final Office Action.
U.S. Appl. No. 11/772,192, Aug. 12, 2013, Notice of Allowance.
U.S. Appl. No. 11/864,596, Jun. 16, 2014, Notice of Allowance.
U.S. Appl. No. 11/864,605, Jul. 3, 2012, Office Action.
U.S. Appl. No. 11/864,605, Nov. 8, 2012, Final Office Action.
U.S. Appl. No. 11/864,605, May 24, 2013, Notice of Allowance.
U.S. Appl. No. 11/864,770, Feb. 4, 2013, Office Action.
U.S. Appl. No. 11/864,770, Jun. 13, 2013, Final Office Action.
U.S. Appl. No. 11/864,770, Nov. 26, 2013, Office Action.
U.S. Appl. No. 11/864,770, May 16, 2014, Final Office Action.
U.S. Appl. No. 11/864,770, Dec. 5, 2014, Office Action.
U.S. Appl. No. 11/864,764, Dec. 10, 2012, Final Office Action.
U.S. Appl. No. 11/864,764, Nov. 20, 2013, Office Action.
U.S. Appl. No. 11/864,764, Jun. 25, 2014, Final Office Action.
U.S. Appl. No. 11/864,764, Jan. 16, 2015, Office Action.
U.S. Appl. No. 11/864,774, Apr. 15, 2013, Notice of Allowance.
U.S. Appl. No. 13/414,512, Aug. 1, 2013, Office Action.
U.S. Appl. No. 13/414,512, Mar. 14, 2014, Final Office Action.
U.S. Appl. No. 13/414,512, Sep. 30, 2014, Notice of Allowance.
U.S. Appl. No. 13/719,084, Jul. 26, 2013, Office Action.
U.S. Appl. No. 13/719,084, Jan. 6, 2014, Notice of Allowance.
U.S. Appl. No. 13/972,089, Apr. 16, 2014, Notice of Allowance.
U.S. Appl. No. 13/414,512, filed Mar. 7, 2012, Nair et al.
U.S. Appl. No. 11/528,772, Oct. 27, 2011, Notice of Allowance.
U.S. Appl. No. 11/528,783, Feb. 14, 2012, Office Action.
U.S. Appl. No. 11/528,790, Jan. 13, 2011, Final Office Action.
U.S. Appl. No. 11/528,790, Jan. 23, 2012, Office Action.
U.S. Appl. No. 11/528,898, Mar. 1, 2012, Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,753, Jun. 17, 2011, Final Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,179, Mar. 29, 2012, Office Action.
U.S. Appl. No. 11/772,192, Jan. 5, 2012, Office Action.
U.S. Appl. No. 11/864,596, Oct. 7, 2011, Final Office Action.
U.S. Appl. No. 11/864,764, Aug. 29, 2011, Final Office Action.
U.S. Appl. No. 11/864,764, May 3, 2012, Office Action.
U.S. Appl. No. 11/864,774, May 11, 2011, Office Action.
U.S. Appl. No. 11/864,774, Dec. 9, 2011, Final Office Action.

* cited by examiner

DATA CLASSIFICATION AND MANAGEMENT FOR RISK MITIGATION

CROSS-REFERENCE TO RELATED APPLICATIONS

Not Applicable.

BACKGROUND OF THE INVENTION

1. The Field of the Invention

The present invention relates to information management. More particularly, embodiments of the invention relate to systems and methods for mitigating security and legal risks associated with data objects stored in a computer system by leveraging an information management system.

2. the Relevant Technology

The world is slowly and continually moving from being paper-based to being electronic-based. This evolution is apparent in almost every aspect of life, from the workplace, to government institutions, to home life. In each area, old paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming the principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As entities become more dependent on electronic data, the ability to manage electronic data becomes crucial for a variety of different reasons. For example, much of the electronic data maintained by an entity or organization often relates to different aspects of the entity and is often subject to various considerations. Without an effective way to manage the electronic data, it is difficult to apply the appropriate considerations to the data.

Further, there are often risks associated with storing electronic data. For instance, entities involved in litigation or other legal proceedings often have a legal duty to disclose to adverse parties all electronic data that is relevant to the litigation during discovery. Failure to identify and disclose all relevant electronic data can result in sanctions against an entity, such as attorneys' fees, admissions of fact, default judgments, and the like. Additionally, laws and/or regulations may exist that define information which must be retained for specific periods of time and/or which must not be kept longer than a specified period of time.

As another example, entities often possess electronic data containing sensitive and/or confidential information that should not be exposed to external entities or to too wide a group of users within the entity. Failure to maintain such information in a secure fashion can subject an entity to serious repercussions, including expenses associated with regulatory compliance when sensitive/confidential information is compromised, lost revenue due to a negative public perception, and adverse effects on potential business deals, to name a few.

Consequently, there currently exists a need in the art for mitigating risks associated with electronic data.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
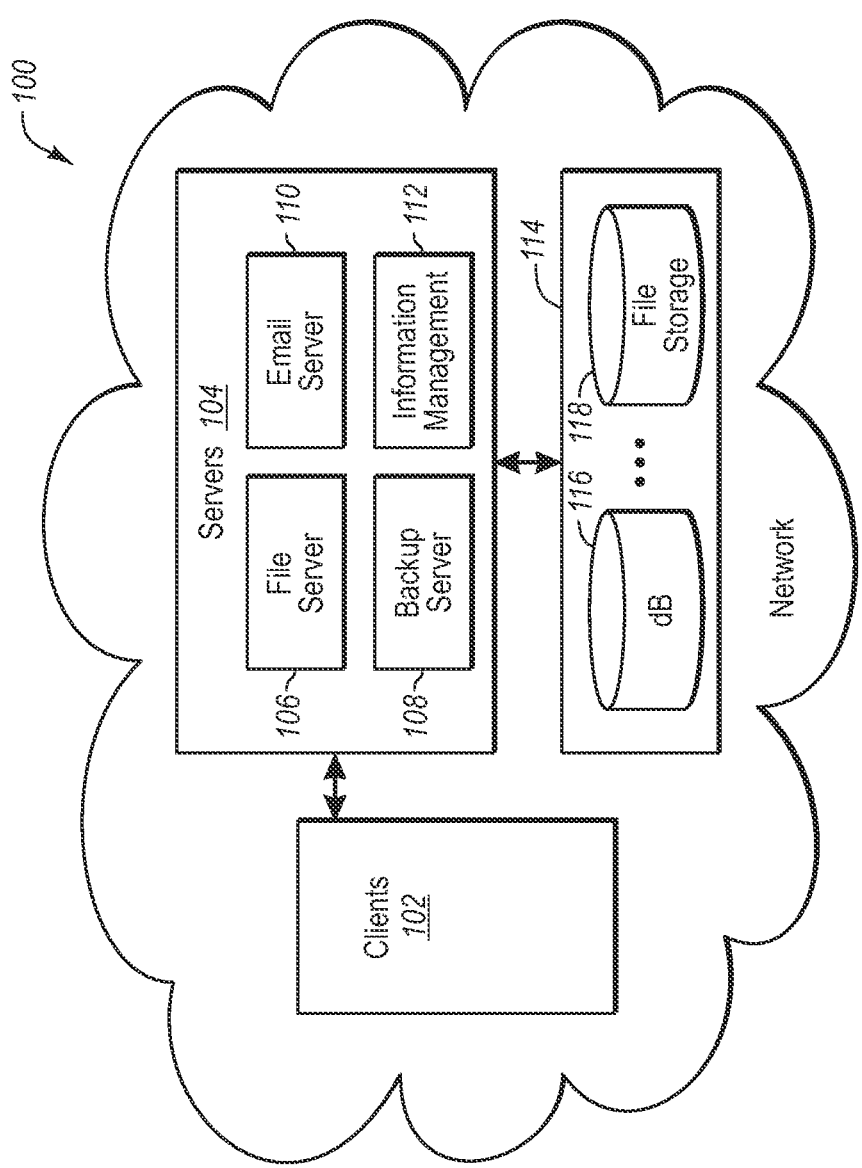
FIG. 1 illustrates an exemplary environment for implementing embodiments of the invention.

Embodiments of the invention relate to the classification and management of objects in a system such as a computer system. Classifying objects enables an information management system to identify and orchestrate services such as data protection, data placement, corporate compliance, and others based on the value of the underlying data. Embodiments of the invention enable the data to be classified in a highly automated fashion that provides various levels of granularity that can be adjusted as needed. The classification and management of data in this manner can assist an entity in mitigating risks associated with data. In one embodiment, an entity can configure the information management system to orchestrate services to maintain the security and prevent the disclosure of certain objects. In another embodiment, a repository of classification information maintained by the information management system can be used to identify data objects that satisfy certain criteria for, e.g., legal discovery. Some or all of the classification information may be contextual information, such as metadata that can be used to generate additional metadata. In another embodiment, classification information can be used to identify data objects requiring retention, deletion, or movement to a location that has restricted access to comply with applicable laws or regulations.

I. Information Management Overview

Information management can be implemented in a variety of different computer or computing systems. A computer system, by way of example only, may refer to a single computer and/or to multiple computers (including clients and/or server computers, and other devices) that are connected with a network.

Implementing information management in accordance with the present invention requires an understanding of the computer system or of servers operating on the system, services operating on the system, and of the objects (files, data, content, servers, databases, applications, information, emails, etc.) that exist in or are accessible by clients, servers, applications, and services on the system. This knowledge can be obtained through discovery of the computer system, which provides the information management system with an understanding of the relationships that may exist between the various servers (and other devices) on the computer system and the data that is accessible over the system. The discovery of a computer system provides the information management system with information that can be used to classify the computer system and the data in the system.

After the computer system (e.g., environment and data) has been discovered, it is useful to classify the data that is in the system. For example, embodiments of the invention enable each object to be categorized and classified individually according to a series of entity-defined rules, although default rules can also be applied. Thus, the groupings identified herein are distinct from coarse groupings that fail to consider the service needs of the objects individually. Classification is discussed more fully below and typically uses a series of rules or logic that are applied to or based on the environment, content, or metadata to differentiate the data. A further aspect of the present invention includes the generation of metadata during the classification. Then, using the existing metadata and metadata generated during the classification process, categories can be assigned to each object.

Once classification is complete, service level management is performed using the assigned categories. Service level management provides methods for modeling/mapping the results of discovery and classification to service levels. After service levels have been identified, the various services can be orchestrated and executed. Advantageously, the services can be carried out with respect to individual objects rather than on shares or drives. As a result, an entity may only pay for the services that are actually needed rather than pay for services that may not be needed. Further, data, including unstructured data, is categorized and can be provided with the services based on its value to the entity. In one embodiment, classification is a way for an entity to automatically place a value on the various objects of data.

Information management is also a process that can be ongoing. In most computer systems, objects are continually added and those objects typically require certain services. In addition to new objects, many objects also have a lifecycle associated with them. Other objects may change over time (by being edited, for example). As a result, the status or need for services for certain objects can change over time. Information management incorporates lifecycle aspects such that data that grows old or stale can have the various services changed as needed.

Also, embodiments of the invention include reports, auditing, gap analysis and the like to ensure that the services being provided are adequate. This protective ability ensures, for example, that a company complies with any applicable rule or regulation. The detection of a gap in service, for example, can lead to a change in service levels.

II. Computer System Environment

FIG. 1 illustrates an example environment for implementing embodiments of the invention. FIG. 1 is intended to illustrate that, while many systems often have similar functions, the actual implementation from one computer system to the next can vary significantly. The variability in computer system configurations is one of the aspects that have hindered conventional attempts at information management. The variability may be related, for example, to the type of software installed, the hardware selected for the computer system, the configuration of the hardware/software and the like. As previously described, this is one of the reasons that discovery of a computer system is not limited to the objects in the system but also includes discovery of the servers and services that are operating in the system. An understanding of the servers and services can improve the ease and accuracy with which objects are classified.

In this example, the system 100 represents a network such as a local area network, a wide area network, and the like or any combination thereof. The connections in the system or network 100 can be wired and/or wireless. In this case, the network 100 typically includes clients 102 that have access to various servers 104 and to data 114. Various applications and services are typically provided by the servers 104 and, in some embodiments, access to some or all of the data 114 is controlled by the various servers 104. Some of the data 114 (e.g., backed up data) is not necessarily available to the clients 102.

Examples of the servers 104 may include a file server 106, an email server 110, a backup server 108, an information management server 112, and the like or any combination thereof. Each of the servers 104 resides in or is accessible over the network 100. The data 114 may include file storage 118, a database 116, and the like. The file storage 118 and database can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, a marketing and sales share, and the like. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the applications that operate on the servers 104, clients 102, and on the data 114 in some instances, may have certain properties or configurations. As previously discussed, it is this variability that can often complicate the ability to manage the information in a computer system.

III. Information Management in a Computer System

Figure 2:
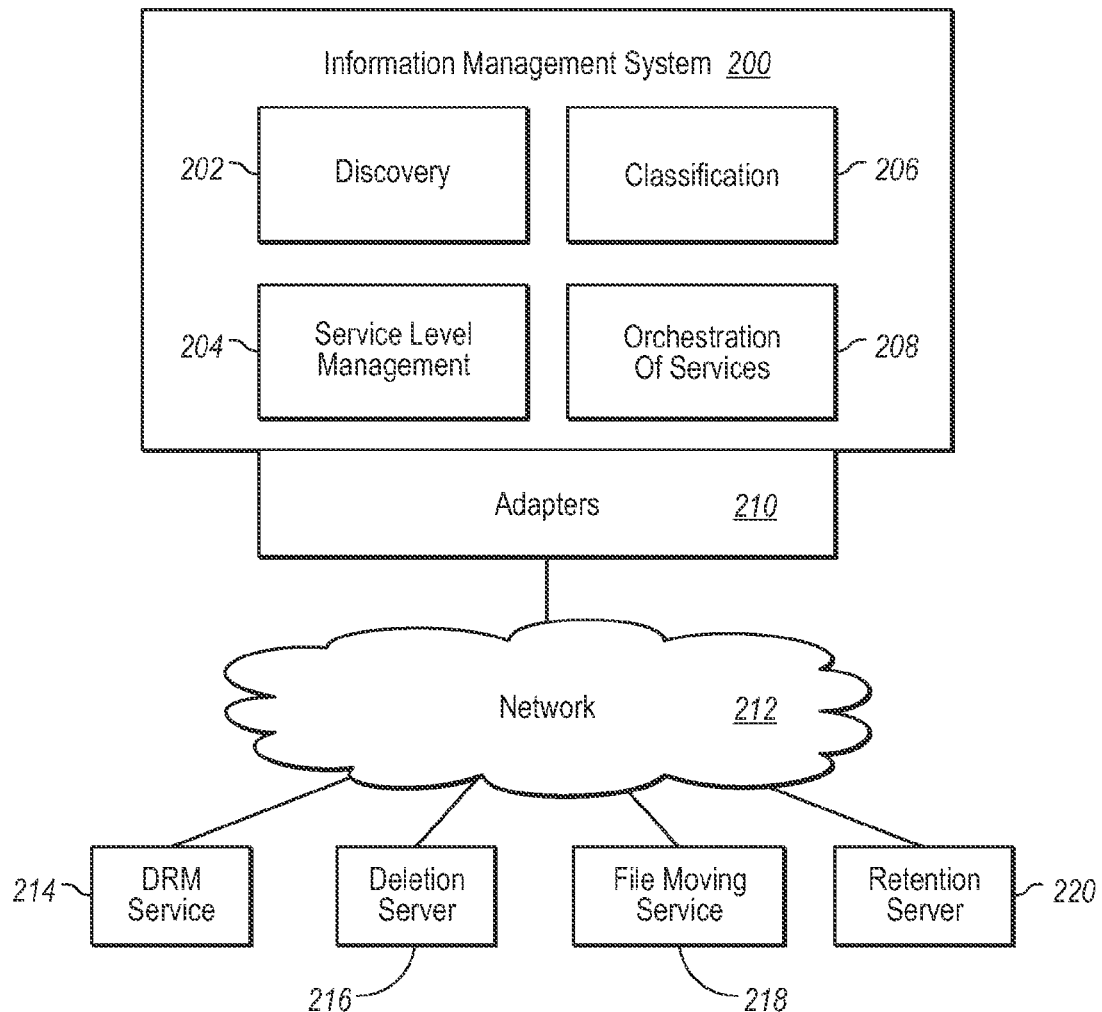
FIG. 2 illustrates one embodiment of a system and/or method for providing information management.

One embodiment of the information management system 112 is illustrated in FIG. 2 at 200. FIG. 2 provides a preliminary overview of information management in a computer system or network 212 that may correspond to the network 100 of FIG. 1. Information management in a computer system or network is discussed in more detail with respect to FIG. 3.

The information management system 200 of FIG. 2 includes various components for performing the functions and processes described herein. Briefly, the information management system 200 includes discovery 202 for discovering the objects in the computer system 212, classification 206 for assigning discovered objects to one or more categories, service level management 204 for mapping one or more service levels to the objects according to the assigned categories, and orchestration of services 208 for orchestrating the services that are provided for each object.

The components of the system 200 work together to provide an understanding of the value of an entity's information. In some instances, the entity itself can provide or define some of the logic or rules that are used to classify or categorize objects. This illustrates one way that embodiments of the invention enable an entity to better value its data. Because objects can be classified or categorized individually using the entity's own logic, the service levels ultimately identified for those objects reflect the entity's perception of the object's worth.

For example, an entity may be required by law or regulation (or may want) to retain objects that were authored by a particular person for a long period of time. A rule to that effect that is processed for the objects of the entity can then help classify the objects in an automated manner and the entity may evaluate the cost of assuring that all objects that satisfy that requirement receive the appropriate services. Advantageously, the present invention enables the entity to use the classification system to evaluate the cost of implementing the desired service levels.

While this example illustrates the evaluation of a single rule or objective, an information management system can examine all business objectives for the objects in a computer system, not just one at a time to associate those objectives to the files without disrupting any additional associations. For example, some of the files authored by a particular person may also contain personal data on employees who have left the entity. Such files often fall under laws that require their destruction after a certain time period. Thus, some of the files authored by the person may need to be retained for a shorter length of time according to a different consideration. One embodiment of information management can thus consider conflicting laws/regulations at the same time, for each object. Thus, aspects of the invention enable a sophisticated information management system to recognize conflicting service goals without disassociating the data from any of the service areas, as in this example, and then resolve the conflict. For example, regulations requiring deletion may have priority over regulations requiring retention, or vice versa. In another example, the objectives may not conflict, but be additive. For example, an entity may desire to retain all files written by a particular author and make those files searchable by indexing them.

Thus, information management can be used in embodiments of the invention to reduce various risks (such as noncompliance) often associated with data including unstructured data. As described below, embodiments of the invention provide a system for classifying data such that the appropriate services can be provided to the data. Embodiments of the invention also enable services that are required by an entity to be effectively identified and orchestrated. Examples of the services often required by entities for their data include backup services, retention services, corporate compliance services, regulatory compliance, data accessibility, data deletion, access control, disaster recovery, data encryption, keyword indexing, and the like or any combination thereof.

A. Discovery in Information Management

Returning to FIG. 2, discovery 202 is often the first aspect of information management. Generally, in one method of information management, discovery 202 includes both a discovery of the infrastructure or of environment objects (servers, devices, applications, etc.) and of the other objects (data, files, etc.) in the computer system. Thus, discovery 202 may be used to discover all the data objects to be classified in a system.

The discovery of the environment objects, for example, can include a discovery of all IP devices on the computer system 100 that appear to act as a server. In addition to discovering these servers, discovery 202 can discover services, devices, applications that offer services, the kinds of services offered by the applications, and levels of service or capabilities supported by a particular service provider.

The discovery of the other objects in the system can include a discovery of files, file systems, directories, and the like.

The discovery of objects in a computer system can be done in a variety of ways. The discovery of the environment objects, for example, may involve an examination or analysis of all IP addresses existing in a network. Devices that act as a server can thus be identified. Once these servers are identified, additional information can then be sought from those servers. Applications can also be identified. For example, many entities often have a payroll application that includes software working in conjunction with a database. The database can be examined and may have certain tables or logs when acting, for example, as a source for the payroll application. The traffic on the network can also be decoded to examine headers to extract information that can characterize the network for the information management server. In this manner, the applications can be discovered. The discovery of an application can be used as additional input when categorizing the objects (e.g., data) used by the payroll (or any other) application. For example, certain data used by a payroll application may require special service levels that are not needed by other data objects.

The discovery of some or all of the objects in a computer system is accomplished, in one embodiment, through the use of adapters 210. Each adapter enables the information management system to discover information about objects in or operating in the computer system 100. For example, some adapters can identify objects acting as a server. Other adapters are specific to a particular type of server and may be able to collect firmware version, operating system, and other configuration data that is specific to that type of server. Other adapters can collect generated metadata or can examine the content to collect the existing metadata.

Discovery can be performed on an ongoing schedule. For instance, initial discovery of an entire computer system can be performed when the information management system is first implemented in the computer system. Thereafter, the discovery module 202 can monitor the system and identify any changes on a regular and/or irregular basis, such as weekly, daily, or immediately upon detecting a change.

B. Classification in Information Management

Classification 206 is typically the next step in information management. Classification 206 is the process of collecting information about the objects of a computer system and then identifying or associating the objects with categories. One result of classification is to associate objects being classified with certain categories. More particularly, the information collected during discovery 202 can be used during classification 206 to assign categories to the objects. The resulting categories assigned to objects in the computer system can be used in subsequent parts of information management as described below.

Classification 206, however, is not limited to the information collected during discovery. Classification 206 can also include, for example, applying sets of rules or other logic to the objects in a computer system and using these rules to generate metadata. Information relating to the classification can be used to create an index which may be stored in a repository, such as in the storage 114 of FIG. 1.

The classification rules can be default rules or rules that are selected according to a line of business of the entity or for any other reason. For example, objects that include social security numbers ("SSNs") may have to be retained for some period of time per governmental regulations. Alternately or additionally, objects relating to employees who have left a company may need to be deleted after a certain period of time per government regulations. Alternately or additionally, objects whose owner is a member of marketing may only be retained for a few years but require full indexing.

In addition to applying rules to the objects of the entity, classification 206 also includes the generation of metadata, and applying the categorization rules to existing and newly generated metadata to assign a category. Generated metadata includes values that are derived from an object rather than having been collected by the environment. For example, hash values can be generated and then used to identify duplicate objects. Alternately or additionally, hash values can be generated and used to authenticate that an object is unchanged in the future, such as during litigation. Another example of generated metadata is the case where the objects are examined for specified keywords and/or patterns. This generated metadata, or metadata derived from an object being analyzed, are useful during the classification process.

Existing metadata, on the other hand, can be collected from the objects or from the environment. For example, the owner, size, share, etc., of a file can be collected and used to automatically categorize an object. The collected metadata (both generated metadata and/or existing metadata) can then be used to assign categories relating to the content of the object or the object itself. In some embodiments, a particular object may be associated with more than one category.

In another embodiment, aging considerations or object lifecycle can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

The classification process may be used in association with service level management, where the classified objects are mapped to various service levels for service level orchestration. In other systems, however, the data classification may be used to identify data objects for further review without performing service level management or service level orchestration. Thus, the service level management and service level orchestration described more fully below may be used in some embodiments in association with the invention, but are not essential for the invention to be successfully performed.

C. Service Level Management in Information Management

After the objects have been categorized during classification 206, service levels or service level objectives can then be identified for the various objects during service level management 204. A category can be mapped through configuration data in one example to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflicts, for example, using user supplied logic.

In other words, the classification process may assign categories to each of the objects. During the classification process, some of the various categories are assigned to each object as applicable. These categories can then be used to identify the service level objectives that may apply to the various objects. The discovery, for example, may have identified a particular object as an annual report and the classification of the annual report assigned a category of business critical. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time, which may be different.

In this manner, the object that has been classified is then processed (using the assigned categories and/or lifecycle information) to identify the various service level objectives that should apply to the object. The service level objectives can then be bundled together into a target bundle that collectively represents the service level objectives that are desired for the object. Next, service level mapping includes matching the target bundle of services with service packages that are actually available from service providers. If the service level objectives do not match or are not satisfied by the best matching actual service package, then a service gap is present.

The use of service packages is often used by some entities that manage some or all of their services by restricting the offerings to a number of supported combinations of service levels. In other words, the particular combination of service level objectives may not represent a supported service package (also referred to herein as a service bundle). Embodiments of the invention contemplate logic that is used to find a suitable service package that is close enough to what the object needs. The information management system may be able to report that no existing service bundle or service package was sufficient.

D. Service Orchestration in Information Management

In information management, orchestration of services 208 is the process by which the services are orchestrated. Orchestration can automate multiple service actions and translate an end user service level request to provider action. The workflow needed to execute the services are coordinated during orchestration. Often, action orchestration requires the adapters 210 to communicate with various service providers or with the various services to identify the service that can perform the requested action.

Examples of various service providers that may provide services to objects within the network 212 are illustrated in FIG. 2. For instance, a DRM service 214 provides encryption of files, a deletion server 216 purges files, including sensitive files stored in locations in which they are too exposed, a file moving service 218 moves sensitive and other files for which moving is desired to secure locations, and a retention server 220 guarantees that a tamper-proof copy of files is stored and available for a specified duration. The service providers 214, 216, 218, and 220 can be used in conjunction with the information management system 200 to provide risk mitigation for an entity storing electronic data. It is understood, however, that the service provides 214, 216, 218 and 220 are provided by way of illustration only and should not be construed to limit the invention in any way.

Figure 3:
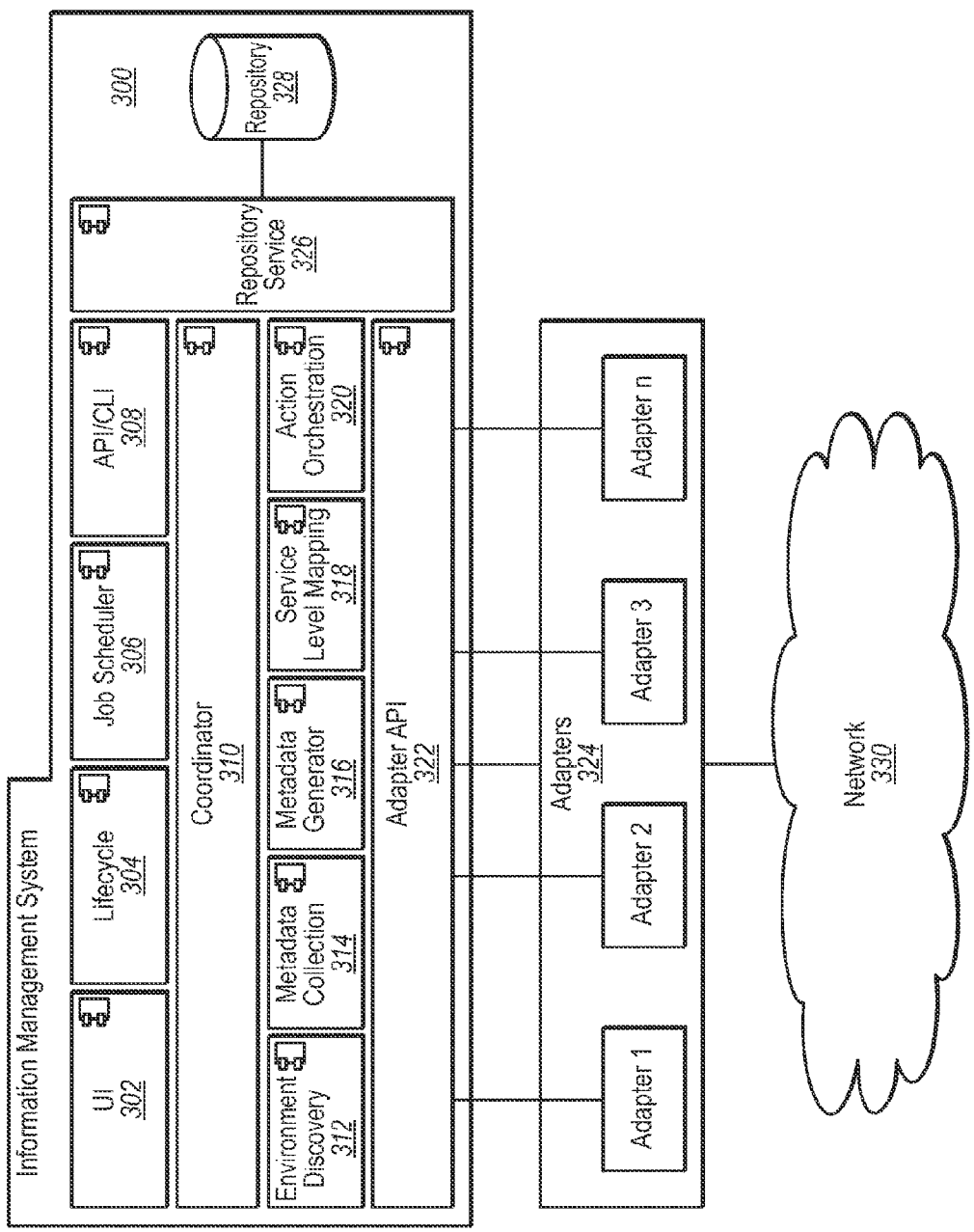
FIG. 3 illustrates another embodiment of a system and/or method for providing information management.

Turning now to FIG. 3, one embodiment of an architecture for information management is illustrated, which may correspond to the information management systems of FIGS. 1 and 2. This embodiment of information management uses adapters to interface with a computer system. By using adapters, the information management system 300 provides scalability and adaptability as the computer system configuration changes over time.

In this example, the system 300 includes an adapter API 322 that interfaces with a plurality of adapters 324. The adapters 324 are used by the information management system 300 to interface with a network 330. Information management 300 uses adapters 324 to discover the infrastructure of the network 330, to discover the objects (data, files, information, etc.) of the network, for classification of the data, and/or for action orchestration.

The adapters 324 can each be specifically prepared to enable the information management system 300 to interface and interact with various aspects of the network. For example, one adapter may enable the system 300 to discover IP devices on the network that are acting like servers. Another adapter may enable the system 300 to discover more information about specific types of network attached storage ("NAS"). Another adapter may enable the system 300 to examine or watch the network in order to discover applications. Adapters 324 can be used in metadata generation, by service orchestration to talk with various components about provided services, to deliver services, and the like or any combination thereof.

For example, if a particular NAS has its own adapter, that adapter can typically collect more information than what can be collected by a generic adapter. The specific adapter can take advantage of features in the NAS that are not necessarily available to other adapters. As more information is discovered or collected, the information management 300 can perform better classification, enable the data to be better evaluated, and assign more appropriate service level objectives. One of skill in the art can appreciate that many different adapters are possible. The adapters 324 can be used by each aspect of the system 300.

The system 300 includes an adapter manager 322 (an API in one embodiment) that provides an interface between the adapters 324 and the system 300. The adapter manager 322 can abstract the interface between the system 300 and the adapters 324 such that adapters can easily be accommodated by the system 300.

The discovery portion 312 of the system uses the adapters 324 to discover the infrastructure and the other objects of the network 330. The discovery portion 312, for example, may use a particular adapter to discover information about a backup server. The discovery portion 312 may also use other adapters to discover the same backup server or to discover objects related to that backup server or within or used by that same backup server. All of the information collected through the adapters 324 can be combined or correlated.

After discovery (or during in some instances), classification is performed. In this embodiment, classification includes metadata collection 314 and metadata generation 316. The metadata collection portion begins to collect metadata about the infrastructure and the objects. This can be performed, for example, by queries through the various adapters 324. Examples of metadata include size, owner, path, line of business, creation date, or any other information that can be collected using an adapter or information that may be provided about the data or device.

Metadata can also be generated during metadata generation 316. For example, metadata generation may use adapters to generate hash files, look for patterns or key words in objects, and the like. The generated metadata generates additional metadata that can be used to classify the data. In this example, the discovery of an object can cascade as additional information is discovered. Generally speaking, cascading discovery includes gathering increasingly detailed descriptions of objects by using the results from each stage of discovery to drive the next stage. For example, metadata generation often begins by looking at the metadata of an object to see if the object is worth further processing. Binary files, for example, may not include any data that is useful in the context of later rules. Thus, the rules may be ignored for certain objects. Next, hash rules may be applied, for example to look for duplicate objects or to provide an audit trail. Metadata generation may also use computer information service rules to look for certain key words, patterns, etc., in an object. Classifier rules can also be used during this process. For example, classifier rules tell how to assign categories to an object (e.g., an object with a social security number is categorized as a HIPPA file). Once generated, the assigned categories are another example of metadata. Often, the logic or rules used to classify or categorize an object are defined by the entity. Alternatively, the logic or rules of an entity can augment standard categorization rules. Finally, category assignment rules are executed that assign the data or objects to one or more categories.

In addition to cascading discovery, embodiments of the invention can cascade classification. For example, the file type, owner, location, etc., of an information object can be used to decide whether to analyze the content of the file (e.g., metadata generation), which will yield more information to be used in the information management process.

Once the categories have been assigned to the various objects, the coordinator 310 may then initiate service level mapping 318. Service level mapping includes identifying service level objectives from the assigned categories of the objects. The desired services are then mapped to services that are actually available. For example, a service provider that offers backup, retention, and other services often offers service packages, but does not typically offer packages that specifically cover every potential need or variation of service. As a result, service level mapping is the process of identifying the best fit based on the service level objectives of an object and the offered service packages. One of skill in the art can appreciate that embodiments of the invention could identify the exact services required for each object, but may be limited by the services that are actually available. As a result, service level mapping includes the process of mapping the services level objectives to available services from the service providers. This process may also identify gaps in service. For example, if none of the service packages available satisfy the service level requirements of an object, this results in a service gap.

Next, the coordinator 310 may provide or initiate action orchestration 320. Action orchestration 320 is the process by which the selected services in the service levels can be delivered. In one example, the action orchestration submits a proposal to orchestration adapters. The adapters report their ability to satisfy the proposal of the action orchestration 320 at specified locations. The action orchestration 320 then selects the best location and adapter set to satisfy the service requirements of the data. The actions may then be performed.

In another embodiment, action orchestration 320 is not performed or is postponed. It is useful to identify what information management can achieve in a given computer system before actually performing or orchestrating the services. Thus, reports can be generated to provide a preview of what may be orchestrated.

The information management system includes a repository service 326 that has access to a database 328. In one embodiment, the database 328 is used to store infoobjects, which are objects used to record the processing state of data in the network and to record specific information. The infoobject can be persisted for state information and can support dynamic properties. For example, as new objects are discovered or additional classification information is found or accumulated, this information can be recorded and stored in the infoobject. For example, an infoobject may include the categories assigned for a particular object. These categories, as described above, can then be used for service level mapping.

In another embodiment, the database 328 may be used to store an index of information associated with the objects such as key words, metadata, assigned categories, or other classification information. For instance, the index may include an object section wherein information identifying a particular object can be stored. Metadata generated and/or collected for an object can be entered into a metadata section. The metadata may include a hash of the object which can be used to authenticate the object for e.g., legal discovery. Key words identified in the content of the object can be stored in a keyword section. Categories assigned to the object can be stored in a categories section. Using this index, the database 328 may be used to respond to rule-based queries.

As noted earlier, FIG. 3 provides an illustration of information management. However, there are some aspects of information management that may not be performed repeatedly. The discovery of the infrastructure, for example, happens less frequently because the environment changes less frequently. More frequently, objects such as files, emails, and other data may change more frequently. Files are created, modified, aged, and the like. As a result, the metadata of these objects can be reviewed regularly and the categories can be reevaluated over time. This enables an information management system 300 to adapt the services received by the objects of the computer environment as the objects change.

As mentioned above, a database 328 that stores information associated with the objects in the network 330 can be used to respond to rule-based queries or searches. The information about the objects can be indexed as described above, or in some other manner. However, building indexes (and in particular, keyword indexes) can consume significant resources. Advantageously, information management allows a user or customer to use the concepts (e.g., classification, service mapping) described herein to select which information gets indexed. Information management enables keyword indexing to be provided as a service and the service is selected according to the output of the service level mapping. Additionally, information management enables deletion (or purging), retention, and tiered storage services.

IV. Legal Risk Management

An information management system can be leveraged to mitigate various types of legal risks, including complying with electronic discovery rules, complying with retention/deletion laws/regulations, reducing litigation risk, and the like or any combination thereof. In particular, one scenario in which embodiments of the present invention may be implemented involves electronic discovery during litigation. Typically during litigation, a party is legally required to produce certain documents and/or information (e.g., all documents that relate to a particular matter but which do not fall under the attorney-client privilege), as required by applicable rules, court orders, and the like. Where the party maintains large amounts of electronic data, the cost of producing all required documents can be significant. Additionally, failure to produce all required documents can result in sanctions. Thus, it is important that the party's discovery process not overlook required documents.

According to embodiments of the invention, an information management system can be leveraged by a party to reduce the costs and mitigate the risks associated with conducting electronic discovery during litigation. The information management system is implemented in a computer system of the party, such as the network 330, and operates as described above to discover objects in the system and perform classification. Optionally, service level management and action orchestration may also occur. During classification, information (e.g., metadata, keywords, categories) regarding objects in the system 330 is stored in the repository 328, and may be indexed. The information stored in the repository 328 can be collected and/or generated in response to user-defined and/or default rules.

In one embodiment, the party creates the user-defined rules for the specific purpose of conducting electronic discovery during litigation. In this case, the classification process applies the rules to generate a list or to specify some action to take with respect to data objects matching certain criteria relevant to the litigation. The relevant criteria may relate to content of the objects (e.g., keywords relating to the litigation), ownership of the objects, format of the objects, location of the objects, and the like or any combination thereof. A list can be generated of objects matching the criteria.

Alternately or additionally, the classification process can categorize objects that match the criteria as requiring some service, such as full keyword indexing, and the like. Service level management and action orchestration can than ensure that the required service be performed. In the case of full keyword indexing, the words/strings parsed from an object can be stored in the database 328, such as in an index entry associated with the object. The party can then use a search engine or other module to perform a search in the database 328 to identify information objects that may be relevant to the litigation.

In another embodiment, an index is generated and maintained in the database 328 in the normal course of business of the party associated with the system 330. User-defined and/or default rules applied during the information management process result in information about objects in the system 330 being stored in the index. In this case, the party can use a search engine or other module to perform a search or query in the database 328 to identify data objects that may be relevant to the litigation for the purpose of electronic discovery.

For instance, in a patent action (e.g., patent infringement, patent invalidity, or the like), a party may desire to locate all electronic documents stored in the party's system that relate to a particular invention and/or technology. Where an index is maintained in the normal course of business of a party, the party can search the index to locate relevant electronic documents (e.g., documents that discuss/mention a particular invention/technology). Alternately or additionally, the party can use the concepts discussed herein to generate an index from scratch and/or to improve a pre-existing index (e.g., by creating rules used in classification that categorize potentially relevant documents as requiring full keyword indexing) that can then be searched/queried.

It is often necessary to provide an audit trail when producing electronic documents in the course of electronic discovery. An audit trail can be used to authenticate a document and ensure that the document is unmodified. One way to provide an audit trail is by generating a hash of an information object when the object is received and storing the hash as metadata of the object, such as in an index in the database 328. When the object is later produced during electronic discovery, the hash can be used to verify that the object is unmodified. Accordingly, the classification process can be used to generate and store hashes of data objects in the normal course of business, and the hashes can later be used during electronic discovery and litigation as a means for authenticating any of the data objects that are produced.

Additionally, the information management system 300 provides a method for maintaining data objects in such a way that they cannot be modified. According to this method, data objects can be categorized during classification as read-only. The classification process also generates and/or stores metadata and other information about the objects in the database 328. Through service level management and action orchestration, modification of the read-only data objects can be prevented. When a read-only object is accessed (such as during electronic discovery or at any other time), the information management system prevents modifications to the read-only object from being saved. Consequently, if a user modifies the read-only object and tries to save the modifications, a new object is saved and the read-only object is unmodified. The new object has metadata and additional information that is stored in the index. Thus, an audit trail is provided via the metadata that can be used to verify that electronic documents produced during electronic discovery are authentic and have not been modified.

An information management system implemented by a party for information management can easily be leveraged by the party for legal discovery. Advantageously, the cost of performing legal discovery using a previously implemented information management system can be much less than hiring another party to perform the discovery or purchasing a separate solution since the information management system provides all necessary tools. Additionally, the fine level of granularity available in the classification process permits a party to identify all potentially relevant data objects (e.g., electronic documents) in order to avoid noncompliance with any applicable discovery rules and/or court orders.

In addition to legal discovery compliance, information management can also be implemented for compliance with laws and regulations requiring deletion (or purging) and retention of certain documents. As previously mentioned, for instance, files and other objects containing personal information about employees who no longer work for an entity may need to be deleted after a certain maximum period of time per a law or regulation. Other types of files and objects may need to be retained for a minimum period of time. Information management permits an entity to define or select rules that group these files into appropriate categories. These categories of files can then be mapped to service level objectives in order to receive appropriate services.

For instance, files including sensitive content can be grouped into a "sensitive" category during classification. Alternately or additionally, .mp3 and other media files larger than a particular size can be grouped into a "large media" category during classification. Further, a user or other administrator can define and/or select policies that associate "sensitive" files and/or "large media" files with the need for purging. Accordingly, the policies can be applied during service level management to map the objects in the "sensitive" and/or "large media" categories to service level objectives that include deletion.

While the invention has been discussed in the context of compliance with electronic discovery, regulatory retention, and/or regulatory deletion, one skilled in the art will appreciate that these are merely examples of specific scenarios in which information management can be used to mitigate legal risks, and the invention contemplates using information management to mitigate other types of legal risks as well. For instance, litigations risks can sometimes be reduced by diligently purging information that the law allows to be purged, in addition to information that the law requires to be purged.

V. Security Risk Management

In addition to helping mitigate legal risks associated with data objects, the information management system 300 can be leveraged to mitigate security risks associated with data objects. For instance, businesses and other entities often maintain sensitive and/or confidential information in a digital format (e.g., as data objects in a computer system) that needs to be protected from external entities and in some cases from one or more users within the businesses/entities. Such sensitive and/or confidential information may include social security numbers, bank account numbers, credit card numbers, trade secrets, confidential reports, and the like or any combination thereof.

Failure to maintain the security of sensitive and/or confidential information can have serious repercussions for an entity. Some jurisdictions, for instance, require a business to individually notify its customers if certain customer information (such as customer credit card numbers) is compromised. Besides the cost involved in notifying the affected customers, the negative public perception that often arises when a business fails to secure sensitive/confidential information can seriously affect the business's future revenues.

As another example, consider an entity preparing to make a takeover offer for a publicly traded corporation. Numerous bids, proposals, presentations and other documents are typically prepared by and for the entity's executives (e.g., officers and directors) in order to analyze and consider the potential takeover. Many times, this and other types of information need to be confined to subsets of users within an entity in order to protect it not only from the public but also from over exposure to other users within the entity. If any of this information is exposed to too wide a group within an entity and/or to the public, the price of the target corporation can be inflated, thereby reducing the profitability of the takeover to the entity and/or dissuading the entity from making any offer whatsoever.

An entity that implements an information management system in its computer system, however, can leverage the information management system to maintain the security of its sensitive and/or confidential information, thereby mitigating the risks associated with the sensitive/confidential information. In one embodiment, for instance, the information management system conducts discovery and classification as described above and optionally stores the results of the classification and/or the information collected during discovery in the data repository 328.

User-defined and/or default security rules can be applied during classification to assign a data object to a security category requiring one or more security measures. Different security categories can require different security measures. The security rules may be used to assign security categories to objects based on one or more of a pattern within the objects (e.g., a nine digit number in a certain format might correspond to a social security number), a creator or owner of the object (e.g., created/owned by an executive), a keyword within the object (e.g., "trade secret," "confidential"), and the like or any combination thereof.

The information management system performs service level management by mapping security categories to service levels that include the one or more security measures required by the security categories. In one embodiment, mapping is performed with reference to information (such as assigned security categories) stored in the repository 328.

Finally, the information management system orchestrates execution of the service levels, including the one or more security measures required by the assigned security categories. The security measures that can be implemented to maintain security of a data object include encryption of the data object (e.g., for storage and/or transport over the network 330), deleting or purging the data object from the system, moving the data object to a secure location, digital rights management of the data object, such as restricting access to the data object to a select group of users (e.g., executives), preventing the data object from being forwarded as an attachment to an electronic message for one or more users, preventing the data object from being printed by one or more users, and preventing the data object from being deleted by one or more users.

One skilled in the art will appreciate that information management permits data objects to be grouped into categories to receive different types or levels of security measures. Thus, some objects can simply be protected from exposure to outside entities while other objects can be protected from overexposure within an entity.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system, a method of leveraging an information management system, the method comprising:
   automatically collecting information about data objects by an information management server, wherein the collected information is stored in a data repository;
   classifying the data objects using at least the collected information to assign categories to each data object by the information management server, wherein classifying the data objects includes applying rules to the data objects to generate at least metadata and assign at least some of the categories to each data object;
   storing results of the classification in the data repository by the information management server, the results stored separately from the data objects, wherein the results include at least one of the metadata, key words, and the assigned categories of each data object; and
   using the results stored in the data repository to identify the data objects and mitigate risks associated with the identified data objects.

2. The method of claim 1, wherein risks associated with the data objects include failure to maintain the security of the data objects.

3. The method of claim 2, wherein using the data repository to mitigate risks associated with the data objects comprises using the data repository to identify one or more data objects requiring one or more security measures.

4. The method of claim 3, further comprising, orchestrating the execution of the one or more security measures with respect to the one or more identified data objects.

5. The method of claim 4, wherein orchestrating the execution of the one or more security measures with respect to the one or more identified data objects comprises orchestrating one or more of: purging the one or more identified data objects from the network, moving the one or more identified data objects to a secure location, encrypting the one or more identified data objects, restricting access to the one or more identified data objects to a select group of users, and preventing the one or more identified data objects from being deleted from the computer system.

6. The method of claim 1, wherein risks associated with the data objects include legal risks including one or more of: failure to comply with discovery requirements during a legal proceeding, failure to comply with a law or regulation requiring information retention, and failure to comply with a law or regulation requiring information deletion.

7. The method of claim 6, wherein using the data repository to mitigate risks associated with the data objects comprises using the data repository to identify one or more data objects in the computer system that a first party associated with the computer system and involved in the legal proceeding is legally required to disclose to a second party involved in the legal proceeding.

8. The method of claim 6, wherein using the data repository to mitigate risks associated with the data objects comprises using the data repository to map the data objects to service level objectives that include deletion after a specified period of time, and orchestrating the deletion.

9. The method of claim 6, wherein using the data repository to mitigate risks associated with the data objects comprises using the data repository to map the data objects to service level objectives that include retention for a specified period of time, and orchestrating the retention.

10. In a computer system, a method of leveraging an information management system for legal risk management, the method comprising:
   collecting information about data objects in a computer system by an information management server, wherein the computer system includes a data repository for storing the collected information;
   classifying the data objects to assign categories to the data objects based on the collected information about the data objects by the information management server, wherein classifying the data objects includes applying sets of rules to the data objects to generate at least metadata and assign at least some of the categories to each data object;

storing the results of the classification in the data repository by the information management server, wherein the results are stored in the data repository separately from the data objects, the results including the assigned categories, metadata and key words of each classified data object; and using the results stored in the data repository to identify one or more data objects a first party associated with the computer system and involved in litigation is legally required to disclose to a second party involved in the litigation.

11. The method of claim 10, wherein the results of the classification are stored in an index in the data repository.

12. The method of claim 11, wherein using the data repository to identify one or more data objects comprises running a search or query on the index in the data repository.

13. The method of claim 10, wherein each data object's collected information includes a hash of the data object.

14. The method of claim 13, wherein the one or more data objects identified using the data repository are disclosed to the second party and wherein the hash associated with the one or more data objects can be used to authenticate that the one or more data objects, as disclosed to the second party, are unmodified.

15. The method of claim 10, further comprising, preventing the one or more data objects from being modified.

16. The method of claim 10, wherein classifying the data objects to assign categories to the data objects based on the collected information about the data objects comprises:

applying the rules to each data object individually, wherein the rules use the content of the data object or the metadata associated with the data object;

generating additional metadata regarding each data object such that the additional metadata is used during classification of the data object;

analysing the content or metadata of the data object, wherein the rules include one or more of hash rules, content analyzer rules, and classifier rules; and assigning one or more categories to each data object.

17. In a computer system, a method of leveraging an information management system for security risk management, the method comprising:

collecting, by an information management server, information about data objects in a computer system;

classifying, by the information management server, the data objects to assign categories to the data objects based on the collected information about the data objects, wherein at least one of the data objects is assigned to a category requiring one or more security measures and wherein classifying the data objects includes applying sets of rules to the data objects to generate at least metadata and assign at least some of the categories to each data object;

storing results of the classification in a data repository, the results stored separately from the data objects, the results including the assigned categories, metadata, and key words of the data objects; and mapping, by the information management server, the category requiring one or more security measures to a service level that includes the one or more security measures with reference to the at least the results in the repository.

18. The method of claim 17, further comprising, orchestrating execution of the one or more security measures.

19. The method of claim 18, wherein orchestrating execution of the one or more security measures comprises orchestrating one or more of: encrypting the at least one of the data objects, restricting access to the at least one of the data objects to a select group of users, deleting the at least one of the data objects from the computer system, moving the at least one of the data objects to a secure location, and preventing the at least one of the data objects from being deleted from the computer system.

20. The method of claim 17, wherein classifying the data objects to assign categories to the data objects based on the collected information about the data objects comprises:

applying the rules to each data object individually, wherein the rules use the content of the data object or the metadata associated with the data object;

generating additional metadata regarding each data object such that the additional metadata is used during classification of the data object;

analyzing the content or metadata of the data object, wherein the rules include one or more of hash rules, content analyzer rules, and classifier rules; and assigning one or more categories to each data object.

* * * * *